(12) United States Patent  (10) Patent No.: US 6,278,211 B1
Sweo  (45) Date of Patent: Aug. 21, 2001

(54) BRUSHLESS DOUBLY-FED INDUCTION MACHINES EMPLOYING DUAL CAGE ROTORS

(76) Inventor: Edwin A. Sweo, 9905 Lake Washington Blvd. NE., Bellevue, WA (US) 98004

( * ) Notice: Subject to any disclaimer, the term of this patent is extended or adjusted under 35 U.S.C. 154(b) by 0 days.

(21) Appl. No.: 09/498,635

(22) Filed: Feb. 7, 2000

Related U.S. Application Data

(60) Provisional application No. 60/119,290, filed on Feb. 9, 1999.

(51) Int. Cl.$^7$ ................................................. H02K 17/18

(52) U.S. Cl. ........................... 310/114; 310/212; 310/125

(58) Field of Search ..................................... 310/112, 114, 310/211, 212, 125; 322/32, 47; 290/40, 54, 55, 43, 44

(56) References Cited

U.S. PATENT DOCUMENTS

| | | | |
|---|---|---|---|
| 3,183,431 | 5/1965 | Ford | 322/32 |
| 3,571,693 | 3/1971 | Riaz | 322/32 |
| 4,229,689 | 10/1980 | Nickoladze | 322/32 |
| 4,246,531 | 1/1981 | Jordan | 322/28 |
| 4,305,001 | 12/1981 | Vamaraju et al. | 290/5 |
| 4,472,673 | 9/1984 | Miller | 322/32 |
| 5,028,804 | 7/1991 | Lauw | 290/40 |
| 5,239,251 | 8/1993 | Lauw | 318/767 |
| 5,798,631 | * 8/1998 | Spee et al. | 322/25 |

OTHER PUBLICATIONS

Li et al.; Two–Axis Model Development of Cage–Rotor Brushless Doubly–Fed Machines; IEEE Transactions on Energy Conversion; vol. 6, No. 3, pp. 453–460 (Sep. 1991).*

* cited by examiner

*Primary Examiner*—Elvin Enad
*Assistant Examiner*—Judson H. Jones
(74) *Attorney, Agent, or Firm*—Ronald M. Anderson (57) ABSTRACT

A brushless doubly-fed induction machine comprising dual cage rotors, suitable for use in generator applications requiring a fixed-frequency electrical output that is independent of a rotational speed at which the machine is driven or motor applications requiring limited variable speed operation when connected to an AC mains. Various embodiments are disclosed, but each includes a stator frame in which first and second annular stators are mounted spaced-apart, end-to-end along a common axis. Each annular stator includes a core wound with polyphase distributed windings defining a plurality of poles. First and second rotors, mounted on a common shaft, are disposed within the first and second annular stators, respectively. Each of the rotors includes a laminated core having a plurality of longitudinally-extending slots defined around a periphery thereof, and at least one conductor is disposed in each slot. Each of the conductors for a given rotor is electrically connected to an end ring disposed at one end of the laminated core for that rotor. The rotor conductors in the first and second rotors are connected to each other, in a reverse phase sequence, through a plurality of interconnection conductors that are disposed between the rotors. The interconnection conductors are preferably of substantially equal length and resistance, and are configured in a pair of concentric layers. Each interconnection conductor occupies one of the concentric layers over its entire length, or one layer over a part of its length and the other layer over a remainder of its length.

26 Claims, 6 Drawing Sheets

BRUSHLESS DOUBLY-FED INDUCTION MACHINES EMPLOYING DUAL CAGE ROTORS

RELATED APPLICATIONS

This application is based on prior copending provisional application Serial No. 60/119,290, filed on Feb. 9, 1999, the benefit of the filing date of which is hereby claimed under 35 U.S.C. § 119(e).

FIELD OF THE INVENTION

The present invention generally concerns brushless induction machines, and more specifically, brushless doubly-fed induction machines with dual rotors.

BACKGROUND OF THE INVENTION

There are many instances in which it is desirable to generate electrical energy at a fixed frequency using a generating machine that is coupled to an input shaft driven by a variable speed source. For example, utilities in many parts of the world use modern wind machines to augment the supply of the electrical energy they provide to their customers from more conventional power plants.

Generally, the electrical energy output from these wind machines is connected to the utility's power grid, which preferably is maintained at a fixed frequency, such as 50 or 60 Hz. In order to couple the wind machines to the power grid, it is necessary that the electrical energy produced by the wind machines be substantially synchronized in phase and frequency with the power grid.

A conventional induction machine can be employed as a generator to produce electrical energy at a frequency that is a function of the speed of the machine's rotor and the number of poles in the machine. However, conventional induction machines have many limitations when used as generators on variable speed input power sources, such as wind machines. Consequently, it has been necessary to develop various measures to enable variable-input-speed generating machines to generate electrical power at a fixed frequency matching that of the power grid. One solution to the problem is to use brushless doubly-fed induction machines, which, when properly controlled and connected to a power grid in an appropriate manner, can generate electrical energy at a frequency matching that of the power grid, independent of the rotational speed of the machine's input shaft, at least within a limited range.

Examples of doubly-fed induction machines are disclose in U.S. Pat. Nos. 3,183,431; 3,571,693; 4,229,689; 4,246,531; 4,305,001; 4,472,673; and 4,701,691. All of these patents disclose brushless doubly-fed induction machines having two stators and two rotors, so that when one of the stator windings is energized with an excitation current, the other produces an output current to drive a load. In all of these prior art doubly-fed induction machines, the dual rotor windings are interconnected, usually in reverse phase sequence.

Figure 1:
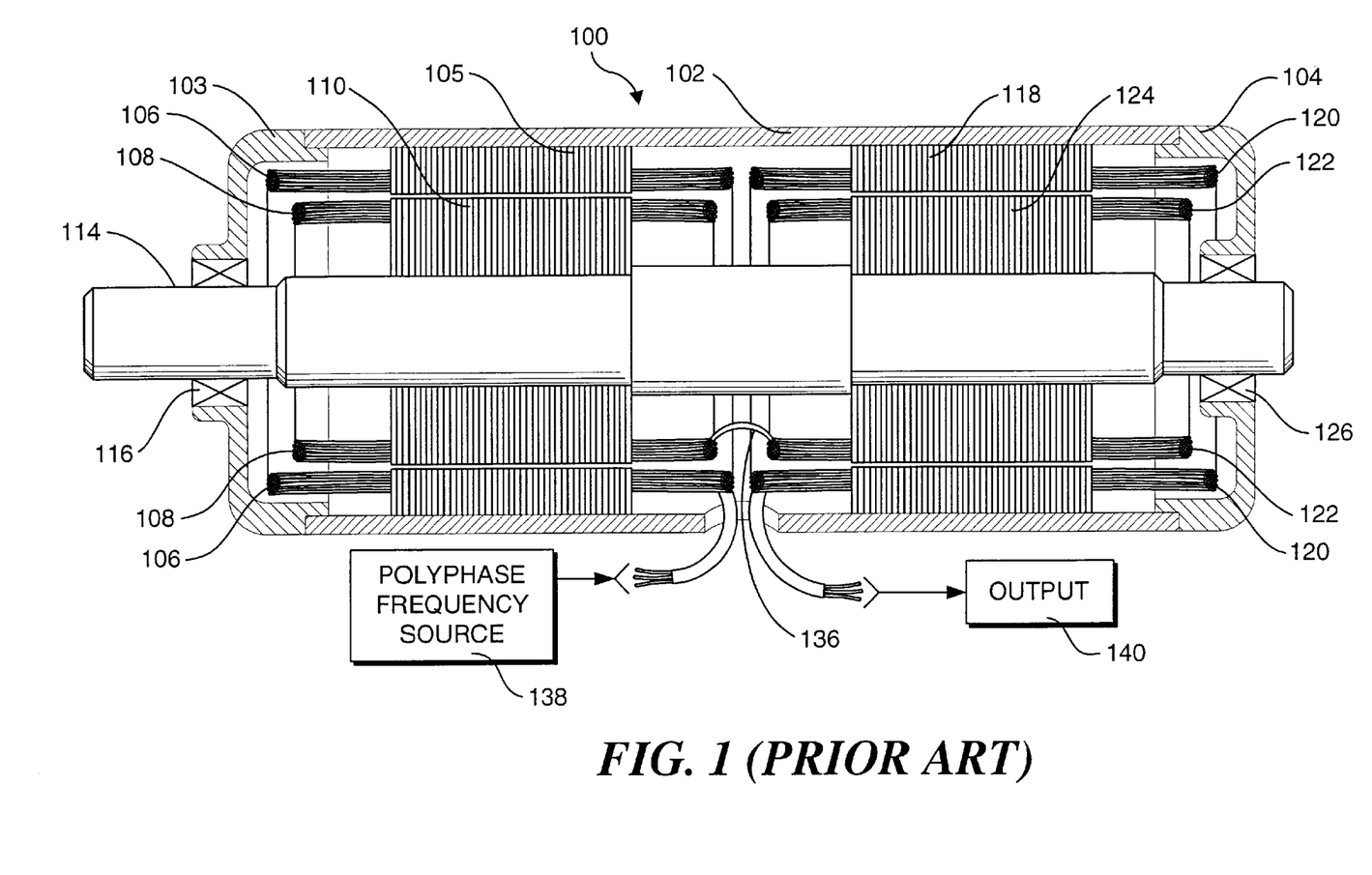
FIG. 1 is a cross-sectional view of a prior art brushless doubly-fed induction machine that employs dual rotors that are wire wound.

FIG. 1 shows a brushless doubly-fed induction machine 100, of the type disclosed in the above-referenced prior art patents. This machine is typically used as a variable speed constant frequency AC generator, but is also usable as a motor. Brushless doubly-fed induction machine 100 includes a cylindrical shell 102 that serves as its housing and is coupled at opposing ends to a pair of end caps 103 and 104, in which bearings 116 and 126 are respectively mounted. Substantially-identical laminated stator structures, including a first stator 105 and a second stator 118, are mounted end-to-end within cylindrical shell 102 around a shaft 114. Laminated rotor structures including a first rotor 110 and a second rotor 124 are mounted on shaft 114, and opposite ends of the shaft are supported by bearings 116 and 126, respectively. Both the first and second rotors are wire wound. Shaft 114 is driven at a variable speed by an external source (not shown).

The rotation of shaft 114 by the variable speed external source also rotates both first rotor 110 and second rotor 124. The first rotor is inductively coupled to magnetic flux produced by the excitation current flowing in first stator 105, but is substantially magnetically isolated from second rotor 124 and second stator 118. Second rotor 124 is inductively coupled with second stator 118, but substantially magnetically isolated from the first stator. First and second stators 105 and 118 are respectively wound with polyphase distributed windings 106 and 120. First stator windings 106 are connected to an external polyphase frequency excitation source 138, which provides an excitation current, while second stator windings 120 are connected to an output load 140, typically an AC mains. First and second stator windings 106, 120 may comprise the same, or different numbers of poles and phases, dependent upon one or more of: (a) the characteristics of polyphase frequency source 138; (b) the input speed range of shaft 114; and, (c) the load.

First rotor 110 and second rotor 124 respectively include rotor windings 108 and 122, comprising polyphase distributed windings of the type commonly used in wound rotor induction machines. Each rotor has the same number of poles as the stator with which it is inductively coupled, and both rotor windings have the same number of phases. Rotor windings 108 and 122 are connected together by plurality of conductors 136, forming a closed electrical circuit, either in an in-phase sequence, or in a reverse phase sequence (in which the flux in second rotor 124 rotates about shaft 114 in a direction opposite that of the flux in first rotor 110).

Brushless doubly-fed induction machine 100 operates in the following manner when connected to a passive load. As shaft 114 is rotated at a given speed, slip frequency currents are generated in first rotor 110, as a result of first rotor 110 rotating within the magnetic flux produced by the excitation current flowing in first stator 105. Second rotor 124 is reverse phase connected to first rotor 110 to receive the current induced in the first rotor. If both the first and second rotors are wound with the same number of poles and first stator 105 is excited with DC current, the resulting current flowing in second rotor 124 produces a magnetic field that is inductively coupled to second stator 118 and which rotates in space at twice the shaft rotation rate. Exciting stator 105 with AC current rotating in the same direction as the shaft subtracts the input frequency from the frequency of the rotating magnetic field applied to stator 118, hence reducing the output frequency of stator 118. Exciting stator 105 with AC current rotating in the opposite direction as the shaft adds the input frequency to the stator 118 output frequency. Thus, the output frequency is the algebraic sum of the input frequency and the shaft rotation frequency, allowing the output frequency to be controlled even through the shaft speed varies.

Although all of the foregoing patents teach brushless doubly-fed induction machines and control systems that employ wound rotors, none of the patents discloses a brushless doubly-fed induction machine that employs dual cage rotors. In general, induction machines that employ cage rotors, which are commonly called "squirrel-cage" rotors due to their similarity in appearance to the cylindrical cages in which squirrels exercise, are preferred over induction machines that employ wound rotors. Cage rotors are usually less expensive to manufacture (for the same output rating), and are very rugged. In view of the need to provide lowcost generators for alternative energy source applications such as wind machines, it will be apparent that there is a need for providing a generator that can be driven at a variable speed with the cost saving advantages of cage rotors. Accordingly, it would be advantageous to provide a brushless doubly-fed induction machine that employs dual cage rotors instead of wound rotors.

SUMMARY OF THE INVENTION

In accord with the present invention, a brushless doubly-fed induction machine that includes dual cage rotors is provided, which is suitable for use in generator applications requiring a fixed frequency electrical output when driven at a variable speed or motor applications requiring limited variable speed operation when connected to an AC mains. The brushless doubly-fed induction machine includes a stator frame in which a first and second annular stator are mounted in spaced apart relationship, end-to-end, along a common axis. Each annular stator includes a core wound with polyphase distributed windings defining a plurality of -poles. First and second cage rotors are mounted on a rotary shaft aligned with the common axis, with the first rotor disposed within the first annular stator, and the second rotor disposed within the second annular stator. Each of the cage rotors comprises a laminated core having an equal number of longitudinally-extending slots defined around a periphery thereof, in which at least one conductor is disposed. In addition, each of the conductors for a given rotor is electrically connected to an end ring disposed at one end of the laminated core of the cage rotor. The conductors in the first and second cage rotors are connected to each other by a plurality of interconnection conductors disposed between the rotors, such that the conductors in the first cage rotor are connected to the conductors in the second cage rotor in a reverse phase sequence. The interconnection conductors are preferably of substantially equal length and resistance, and extend between the first and second cage rotors in a plurality of concentric layers. Each interconnection conductor occupies at least a portion of one of the concentric layers over a length of the interconnection conductor.

Various embodiments of the invention include first and second cage rotors having an equal number of slots and poles, an equal number of slots and a dissimilar number of poles, and a dissimilar number of slots and poles.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Figure 2:
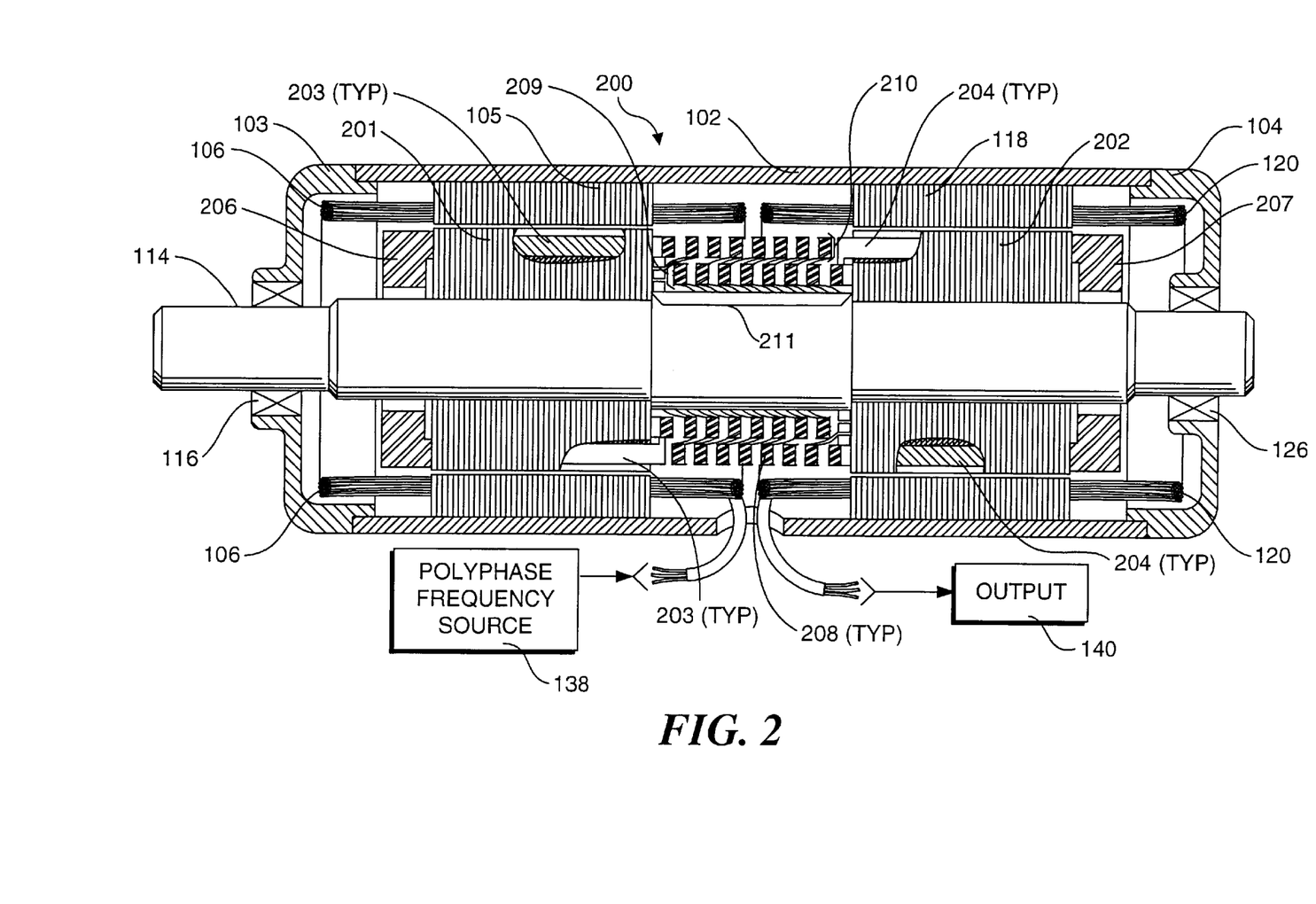
FIG. 2 is a cross-sectional view of a brushless doubly fed induction machine in accord with the present invention, in which a pair of cage rotors are connected in reverse phase sequence by two concentric layers of interconnection conductors.

A preferred embodiment of a brushless doubly-fed induction machine 200 in accord with the present invention is shown in FIG. 2. Rather than using conventional wound rotors, induction machine 200 employs a pair of cage rotors 201, 202 that are connected in a reverse phase sequence by two substantially concentric layers of conductors 208. All other elements of brushless doubly fed induction machine 200 are substantially identical to (and share the same reference numerals with) corresponding elements discussed above with respect to prior art brushless doubly-fed induction machine 100 shown in FIG. 1. Accordingly, a further description of these components is not provided herein. In addition, each of the exemplary rotor configurations discussed below may be implemented in brushless doubly-fed induction machine 200.

Each of first and second rotors 201, 202 comprise laminated structures in which a plurality of evenly spaced-apart, longitudinally extending slots are defined about a periphery thereof. At least one conductor is disposed within each slot, as indicated by rotor conductors 203 and 204 shown in FIG. 2.

Preferably, each rotor conductor is formed as a metal bar having a square or rectangular cross section, although rotor conductors having other cross sections may alternatively be used. All rotor conductors 203 in first rotor 201 are connected at one end in common to a first rotor end ring 206, while all of rotor conductors 204 in second rotor 202 are connected in common at an opposite end to a second rotor end ring 207. Respective pairs of rotor conductors 203 and 204 in the first and second rotors are connected together by specific interconnection conductors 208 that extend through a region 211 between the rotors so as to form a complete electrical circuit. Interconnection conductors 208 are arranged in two substantially concentric layers within region 211 that include an inner layer 209 and an outer layer 210, and are configured such that sets of conductors 203 and 204 corresponding to respective poles are wired in a reverse phase sequence. Furthermore, the interconnection conductors in inner layer 209 are arranged to form substantially equal pitch counterclockwise spirals about shaft 114 when viewed from the left end of the shaft, while the interconnection conductors in outer layer 210 are arranged to form substantially equal pitch clockwise spirals about shaft 114 when viewed from the left end of the shaft.

In each of the exemplary rotor configurations discussed herein, when an interconnection conductor 208 occupies inner layer 209, other interconnection conductors may pass outside it, as shown in FIGS. 3A, 3B, 4A, 4B, 5, 6, and 7. Similarly, when an interconnection conductor occupies the outer layer, interconnection conductors may pass inside it in the inner layer. Furthermore, transitions of each interconnection conductor 208 between the inner and outer layers occur at a location where no other conductors interfere in either layer, as shown in the aforementioned Figures. Preferably, all interconnection conductors 208 should be substantially equal in length and will be of substantially equal resistance when the cross section of the interconnection conductors is substantially constant.

When the number of poles in stators 105 and 118 are the same, rotors 201 and 202 are generally identical, mirror image configurations. In such instances, each set of rotor conductors 203 and 204, which define respective poles on each rotor, is interconnected in reverse phase sequence by interconnection conductors 208. First, second and third exemplary rotor configurations comprising dual cage rotors with an equal number of poles and slots are respectively shown in FIGS. 3A and 3B, 4A and 4B, and 5. In the configuration shown in FIG. 3A, interconnection conductors 208 are used to connect rotor conductors 203, 204 corresponding to a pair of two-pole cage rotors 201, 202 having thirty slots each. In this Figure, the conductors are shown as if they were unwrapped from their respective rotors and laid flat. This type of rotor configuration is very typical for two pole rotor industrial induction motors and generators that employ a single squirrel-cage rotor.

Figure 3A:
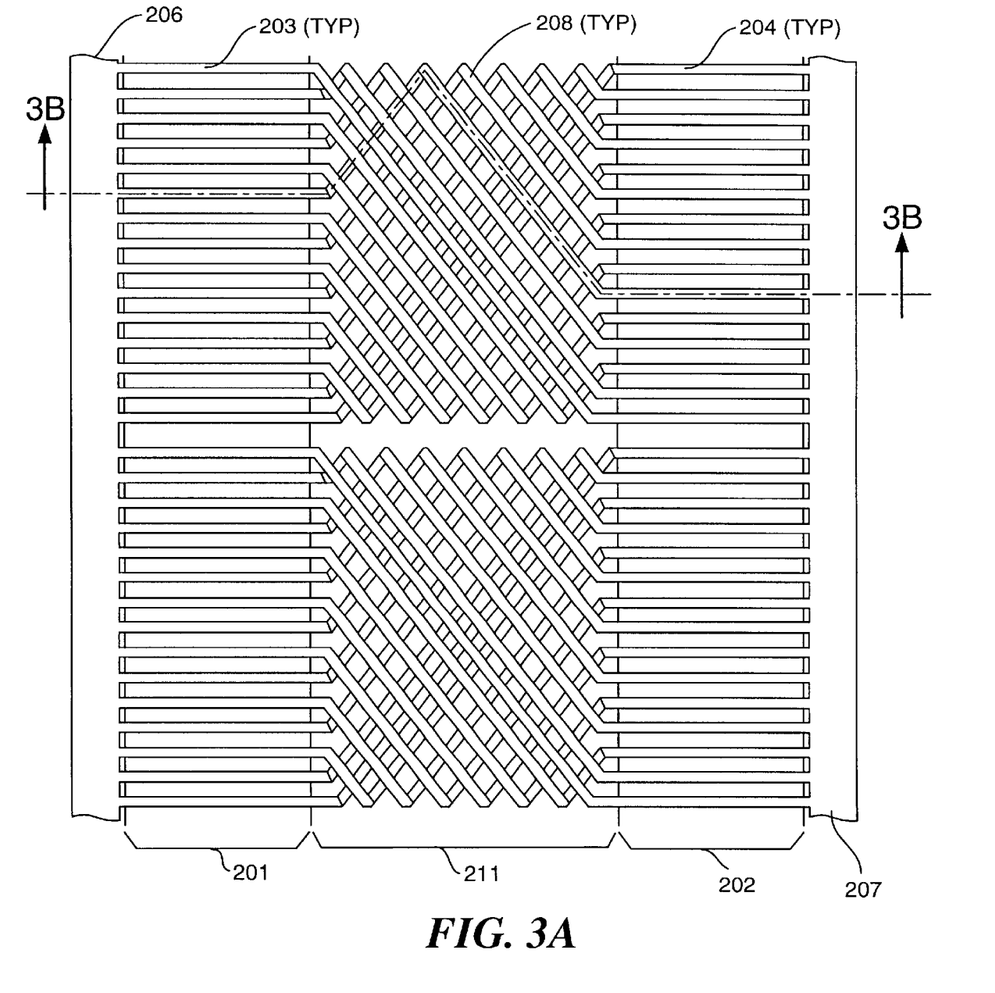
FIG. 3A is a detailed drawing showing unwrapped rotor and interconnection conductors corresponding to a first exemplary brushless doubly-fed induction machine that employs dual two-pole cage rotors having thirty slots each.
Figure 3B:
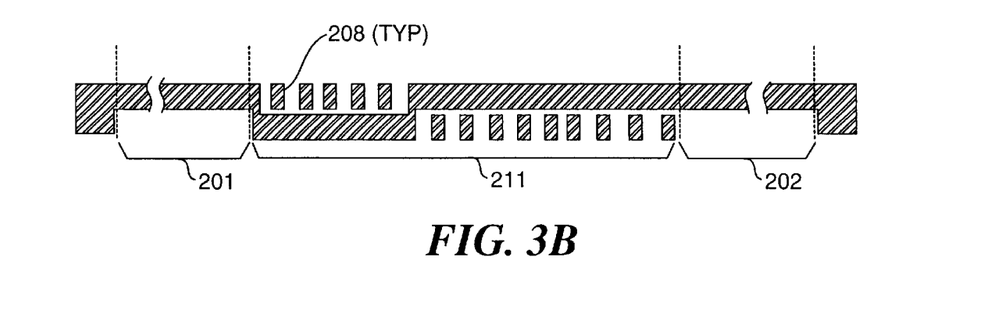
FIG. 3B is a cross-sectional view of an exemplary conductor taken along section line 3B—3B shown in FIG. 3A.

FIG. 3B illustrates a cross section of a typical conductor as it passes from end ring 206 through first rotor 201, the interconnection area, second rotor 202 and end ring 207. (Note, that in actual use, end rings 206, 207, rotor conductors 203, 204 and interconnection conductors 208 comprise portions of continuous conductors that can comprise one or more separate components, depending on the particular manufacturing method used; for clarity, these components are described herein as separate conductors.) As shown in the Figure, each of interconnection conductors 208 may occupy either the inner or outer layer or, more typically, extend within one layer for part of the length of the interconnection conductor and in the other layer over a different part of the length.

Figure 4A:
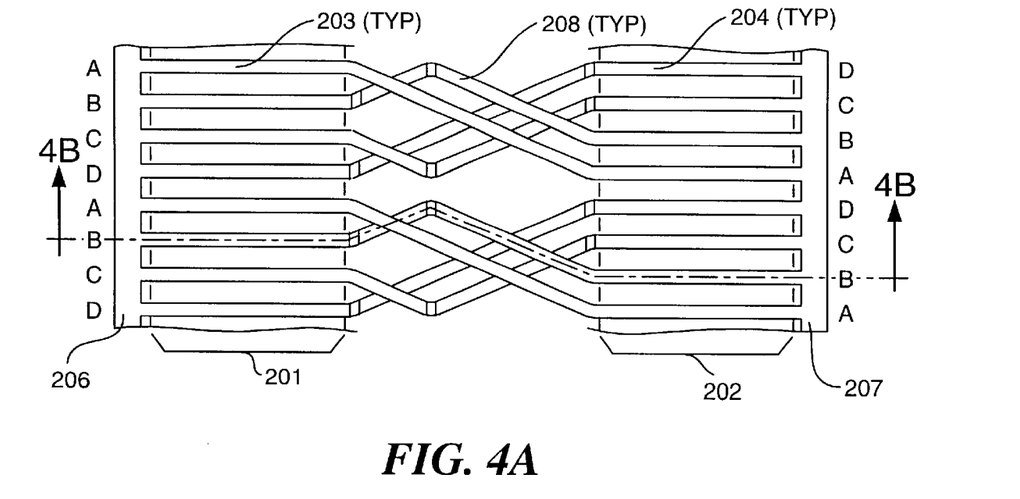
FIG. 4A is a detailed drawing showing unwrapped rotor and interconnection conductors corresponding to a second exemplary brushless doubly-fed induction machine that employs dual two-pole cage rotors having eight slots each.
Figure 4B:
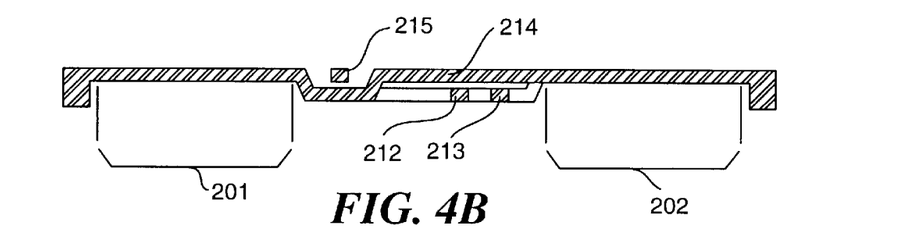
FIG. 4B is a cross-sectional view of an exemplary conductor taken along section line 4B—4B in FIG. 4A.

FIG. 4A illustrates a set of two-pole cage rotor conductors that have been unwrapped from a pair of rotors having eight slots each. In this configuration, the interconnection conductors are arranged such that for each pole set of conductors, conductors 203 are connected in reverse phase with conductors 204. In general, a similar reverse phase connection scheme can be applied to any pair of rotors that have the same number of slots by connecting the conductors between the first and second stators such that each pole set of conductors of the first rotor are arranged in a given rotational sequence when viewed looking toward the end ring of the first rotor (e.g., clockwise), while the second rotor conductors corresponding to that pole are arranged such that they are sequenced in the opposite direction of that of the first rotor (e.g. counter-clockwise). For example, with reference to the two-pole eight slot rotor configuration shown in FIG. 4, if the conductors were viewed by looking toward the end ring 206 of first rotor 201 (i.e., from the left-hand side), conductors 203 of first rotor 201 would be arranged in an A->B->C->D clockwise sequence for each pole set of conductors, while conductors 204 of second rotor 202 for those pole sets would be arranged in an A->B->C->D counter-clockwise sequence.

For ease of manufacture, in an ideal rotor configuration for use in an inductive machine with an equal number of poles in both stators, the number of rotor slots is an even integer multiple of the number of stator pole pairs. This relationship enables the rotor interconnection conductors 208 to be arranged in a number of identical groups, which are equal to the number of stator poles. This condition is true of the embodiment shown in FIG. 3A, where the conductors in the 30 rotor slots formed in each of the two rotors are connected with two identical groups (corresponding to respective rotor poles) of 15 interconnection conductors 208 each.

Figure 5:
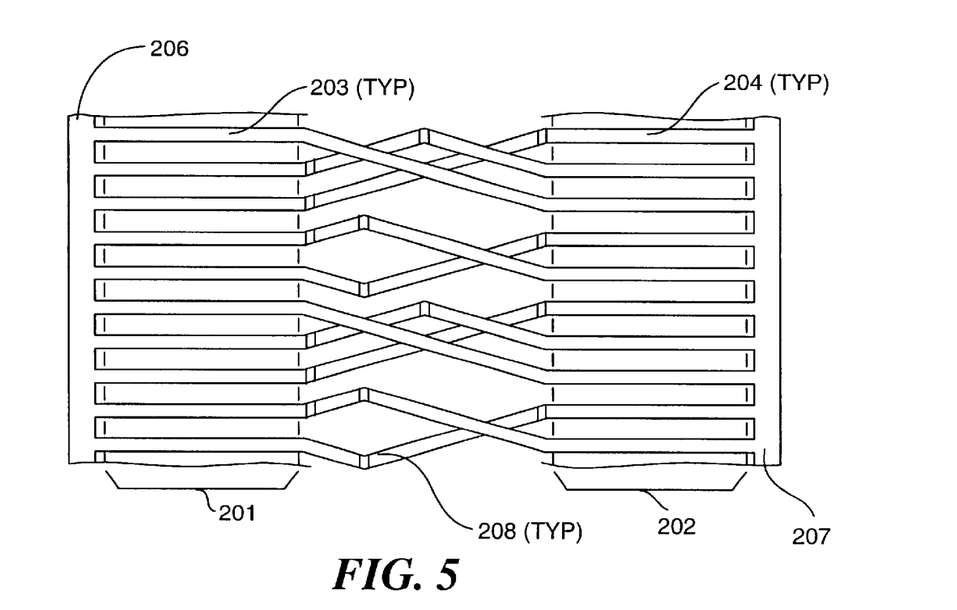
FIG. 5 is a detailed drawing showing unwrapped rotor and interconnection conductors for a third exemplary brushless doubly fed induction machine that includes four-pole cage rotors with ten slots each.

Providing a number of rotor slots that is an odd integer multiple of the number of stator pole pairs enables interconnection of the conductors on the first and second rotor with two different sets of grouped interconnection conductors 208, wherein the configuration of the interconnection conductors in one set of grouped interconnection conductors is different than those in the other set. Such a configuration is shown in FIG. 5, wherein one set of grouped interconnection conductors alternates with the other set of grouped interconnection conductors.

It should also be noted that any number of rotor slots can be used, including an odd number of slots. In this case, the rotors must be interconnected as two pole rotors regardless of the number of stator poles, and a wider spacing is required between rotors comprising four or more pole stators than for the integermultiple rotor slot configurations described above. Furthermore, there will not be any identical connection conductors 208 when an odd number of rotor slots are used.

Figure 6:
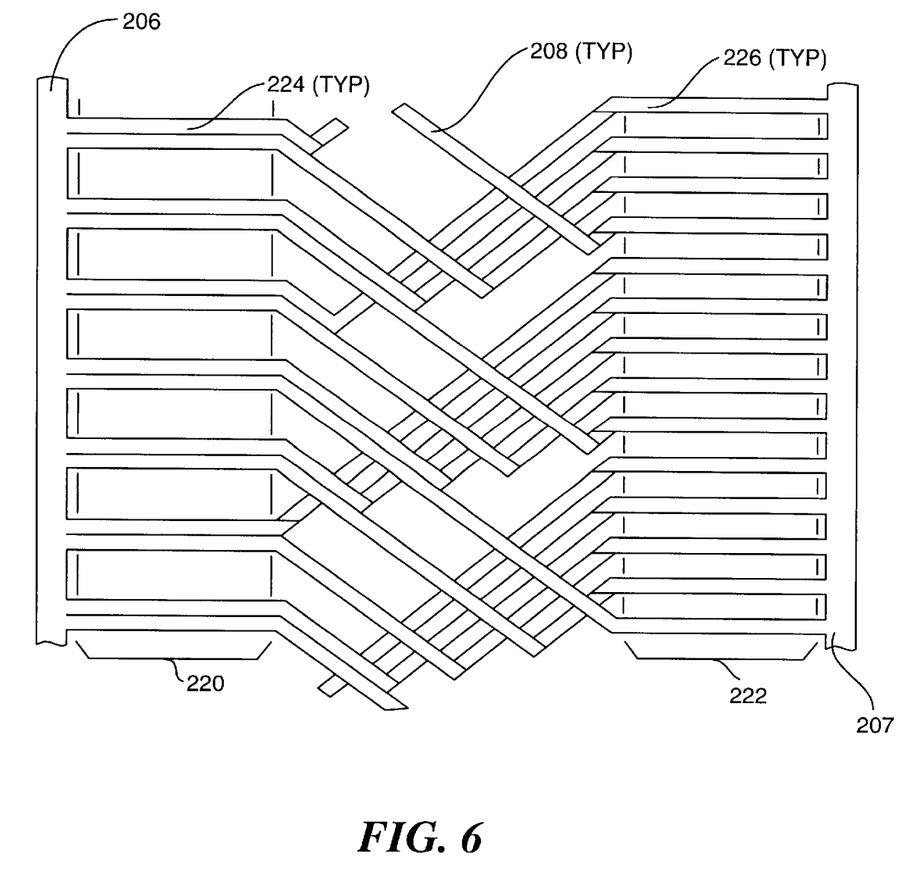
FIG. 6 is a detailed drawing showing unwrapped rotor and interconnection conductors for a fourth exemplary brushless doubly fed induction machine that includes a two-pole/seven-slot cage rotor and a four-pole/fourteen-slot cage rotor.

When one stator has twice the number of poles as the other, the rotor disposed within the stator having fewer poles must have either the same or onehalf the number of slots as the rotor disposed within the stator having more poles. Any even number of rotor slots can be used in the rotor operating with the greater number of stator poles. One bar in each slot of the rotor with half the number of slots may be connected to two interconnection conductors 208, or two bars may be used in each slot of the rotor with half the number of slots, one for each interconnection conductor 208. For example, FIG. 6 illustrates a configuration in which a first rotor 220 comprises seven slots, and a second rotor 222 comprises fourteen slots. One way to interconnect the conductors in the slots of the two rotors under this rotor configuration is to have two rotor conductors 224 occupy each of the slots in first rotor 220, while a single rotor conductor 226 occupies each of the slots in second rotor 222. Under this configuration, a single interconnection conductor 208 is connected to each rotor conductor.

Figure 7:
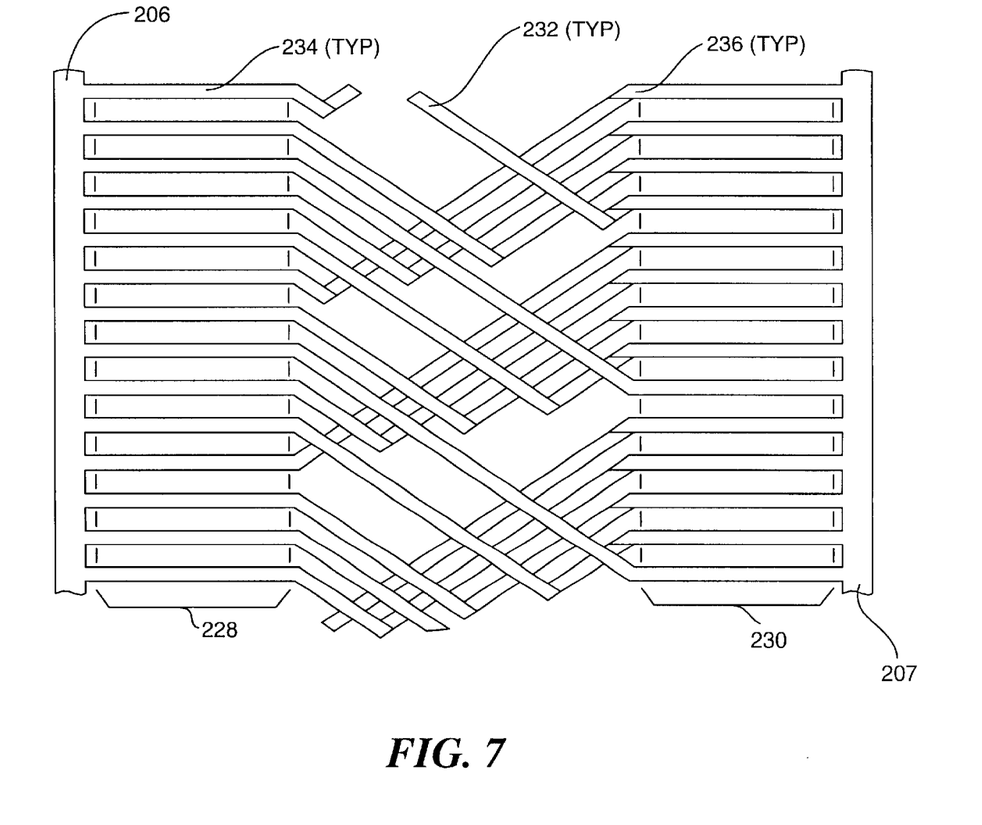
FIG. 7 is a detailed drawing showing unwrapped rotor and interconnection conductors for a fifth exemplary brushless doubly fed induction machine that includes a two-pole/fourteen-slot cage rotor and a four 25 pole/fourteen-slot cage rotor.

FIG. 7 illustrates a configuration corresponding to a pair of fourteen slot rotors that are configured such that a first rotor 228 comprises two poles, while a second rotor 230 comprises four poles. A plurality of interconnection conductors 232 are employed to connect rotor conductors 234 and 236 in a reverse phase sequence.

The dual cage rotor assemblies corresponding to the foregoing exemplary configurations (as well as other configurations in accord with the present invention) may be constructed by employing various known motor/generator manufacturing techniques, as will be well known to those skilled in manufacturing conventional single cage rotor induction motors and generators. Suitable steps for producing the dual cage rotor assemblies in accord with the present invention include:

Die casting the complete dual rotor cage conductor and end ring assembly on a double rotor lamination assembly. A removable or non-magnetic electrically insulated die is required for conductors 208 in interconnection region 211.

Die casting each individual rotor complete with an end ring on one end and rotor conductors extending from respective slots on the other end. The interconnection conductors 208 can then be inserted between the two rotors after assembly on the shaft and then connected to extended rotor conductors 203 and 204 to complete construction of the cage assembly. Note that configurations of interconnection conductors 208 illustrated in FIGS. 3A, 4A, 5, 6, and 7 always allows sequential insertion of conductors 208 after the two rotors and the conductors in the slots of the rotors have been completed.

Each interconnection conductor 208 can be prefabricated with its associated rotor conductors 203 and 204 for the two rotors, then each conductor assembly sequentially inserted into appropriate rotor slots and connected with the remaining conductors on the outer ends by end rings 206, 207. These steps are similar to the technique used when fabricating single cage rotors. Furthermore, fabrication techniques such as casting, bending, machining, brazing, silver soldering and insulating may be used to manufacture each conductor.

Multiple individual conductors can be grouped for each of the cage rotor and interconnection conductors. Round, square, rectangular, as well as other cross-sectional configurations of individual conductors can be used to provide the necessary flexibility so that each interconnection conductor and it's associated rotor conductors can be inserted into appropriate slots and formed on the rotor structure.

Although the present invention has been described in connection with the preferred form of practicing it, those of ordinary skill in the art will understand that many modifications can be made thereto within the scope of the claims that follow. Accordingly, it is not intended that the scope of the invention in any way be limited by the above description, but instead be determined entirely by reference to the claims that follow.

The invention in which an exclusive right is claimed is defined by the following:

1. An electrical polyphase brushless doubly-fed induction machine comprising:
   (a) a stator frame in which a first annular stator and a second annular stator are mounted in spaced apart relationship, end-to-end, along a common axis, each annular stator having an annular core wound with polyphase distributed windings defining a plurality of poles,
   (b) a rotary shaft that is rotatably mounted and extends centrally through said first and second annular stators, axially aligned with said common axis;
   (c) a first cage rotor and a second cage rotor mounted on the rotary shaft, said first cage rotor being disposed within said first annular stator and said second rotor being disposed within said second annular stator, each of said first and second rotors comprising a laminated core having a plurality of generally longitudinally-extending slots defined around a periphery thereof in each of which at least one conductor is disposed, all conductors for a given cage rotor being electrically connected to an end ring disposed at an end of the laminated core of that cage rotor; and
   (d) a plurality of interconnection conductors electrically connecting the conductors in the plurality of slots of first cage rotor to the conductors in the plurality of slots of the second cage rotor, in a reverse phase sequence.

2. The electrical machine of claim 1, wherein said plurality of interconnection conductors are arranged in a plurality of substantially concentric layers disposed between the first and second cage rotors, each interconnection conductor occupying at least a portion of one layer over a length of the interconnection conductor.

3. The electrical machine of claim 2, wherein said plurality of interconnection conductors are arranged in spirals of substantially equal pitch, with interconnection conductors in adjacent concentric layers spiraling in opposite directions.

4. The electrical machine of claim 1, wherein said plurality of interconnection conductors have substantially equal resistance.

5. The electrical machine of claim 1, wherein said plurality of interconnection conductors are substantially equal in length.

6. The electrical machine of claim 1, wherein each of the first and second annular stators have an equal number of poles, and each of the first and second cage rotors have an equal number of slots.

7. The electrical machine of claim 1, wherein the second annular stator has twice as many poles as the first annular stator, and the second cage rotor has twice as many slots as the first cage rotor.

8. The electrical machine of claim 1, wherein the second annular stator has twice as many poles as the first annular stator, and wherein the first and second cage rotors have an equal number of slots.

9. The electrical machine of claim 6, wherein the number of slots in each of the first and second cage rotors is an odd integer multiple of the number of stator pole pairs.

10. The electrical machine of claim 6, wherein the number of slots in each of the first and second cage rotors is an even integer multiple of the number of stator pole pairs.

11. The electrical machine of claim 6, wherein the number of slots in each of the first and second cage rotors is an odd integer.

12. A dual cage rotor assembly for use in an induction machine, comprising:
   (a) a rotary shaft adapted to be rotatably mounted in an induction machine;
   (b) a first cage rotor and a second cage rotor mounted on the rotary shaft in spaced-apart relationship, each of said first and second cage rotors comprising a laminated core having a plurality of generally longitudinally-extending slots defined around a periphery thereof, at least one conductor being disposed in each slot and being electrically connected to an end ring disposed at an end of the slot in the laminated core in which the conductor is disposed; and
   (c) a plurality of interconnection conductors extending between the first and second cage rotors and electrically connecting the conductors in the first cage rotor to the conductors in the second cage rotor in a reverse phase sequence.

13. The dual cage rotor assembly of claim 12, wherein said plurality of interconnection conductors are arranged in a plurality of substantially concentric layers, each interconnection conductor occupying one layer over at least a portion of a length of the interconnection conductor.

14. The dual cage rotor assembly of claim 13, wherein said plurality of interconnection conductors are arranged in spirals of substantially equal pitch, with interconnection conductors in adjacent concentric layers spiraling in opposite directions.

15. The dual cage rotor assembly of claim 12, wherein said plurality of interconnection conductors have substantially equal resistance.

16. The dual cage rotor assembly of claim 12, wherein said plurality of interconnection conductors are substantially equal in length.

17. The dual cage rotor assembly of claim 12, wherein said first and second cage rotors have an equal number of slots, and each of the conductors in the first cage rotor are connected to a respective conductor in the second cage rotor, by the interconnection conductors on a slot-wise basis.

18. The dual cage rotor assembly of claim 12, wherein the second cage rotor has twice as many poles and slots as the first cage rotor, each slot in the first cage rotor being occupied by a pair of conductors, and each slot in the second cage rotor being occupied by a single conductor.

19. The dual cage rotor assembly of claim 12, wherein the first and second cage rotors have an equal number of slots, and wherein the conductors in the first and second cage rotors are connected by the interconnection conductors in alternating groups having a different number of conductors in each group.

20. The dual cage rotor assembly of claim 12, wherein the first and second cage rotors have an equal number of slots, and the conductors in the second cage rotor are grouped so as to define twice as many poles as the conductors in the first cage rotor.

21. An electrical polyphase brushless doubly-fed generating machine comprising:
(a) a stator frame in which a first annular stator and a second annular stator are mounted in spaced apart relationship, end-to-end, along a common axis, each annular stator having an annular core wound with polyphase distributed windings defining a plurality of poles, said first annular stator being adapted to connect to a polyphase excitation source to cause a first electromagnetic flux to be generated in said first annular stator, and said second annular stator being adapted to connect to a load;
(b) a rotary shaft rotatably mounted to extend centrally through said first and second annular stators, axially aligned with said common axis;
(c) a first cage rotor and a second cage rotor mounted on the rotary shaft, each comprising a laminated core having a plurality of generally longitudinally-extending slots defined around a periphery thereof in which at least one conductor is disposed, each conductor for a given cage rotor being electrically connected to an end ring disposed at an end of the laminated core of that cage rotor, the first cage rotor being disposed within the first annular stator so as to inductively couple with the first electromagnetic flux generated by the first annular stator, producing an electrical current that circulates through the conductors of the first cage rotor, the second cage rotor being disposed within the second annular stator so as to inductively couple the second annular stator; and
(d) a plurality of interconnection conductors electrically connecting the conductors in the first cage rotor to conductors in the second cage rotor in a reverse phase sequence, so that the electrical current in the first cage rotor also circulates through the conductors in the second cage rotor, said electrical current in the second cage rotor producing a second electromagnetic flux that inductively couples with the second annular stator, causing an output electrical current to be generated in the second annular stator.

22. The generating machine of claim 21, wherein the rotary shaft is adapted to be driven by a prime mover at a variable input speed, a frequency of the output electrical current being controlled at least in part by a frequency of the polyphase excitation source.

23. An electrical polyphase brushless doubly-fed generating machine comprising:
(a) a stator frame in which a first annular stator and a second annular stator are mounted in spaced apart relationship, end-to-end, along a common axis, each annular stator having an annular core wound with polyphase distributed windings defining a plurality of poles, said first annular stator being adapted to connect to a polyphase excitation source to cause a first electromagnetic flux to be generated in said first annular stator, and said second annular stator being adapted to connect to an AC mains;
(b) a rotary shaft rotatably mounted to extend centrally through said first and second annular stators, axially aligned with said common axis;
(c) a first cage rotor and a second cage rotor mounted on the rotary shaft, each comprising a laminated core having a plurality of generally longitudinally-extending slots defined around a periphery thereof in which at least one conductor is disposed, each conductor for a given cage rotor being electrically connected to an end ring disposed at an end of the laminated core of that cage rotor, the first cage rotor being disposed within the first annular stator so as to inductively couple with the first annular stator, the second cage rotor being disposed within the second annular stator so as to inductively couple with the second annular stator; and
(d) a plurality of interconnection conductors electrically connecting the conductors in the first cage rotor to conductors in the second cage rotor in a reverse phase sequence, so that the electrical currents in the first cage rotor conductors also circulate through the conductors in the second cage rotor, said electrical currents being determined by the shaft rotation speed and the frequencies and voltages applied to the two annular stators, causing an electrical current to be generated in the second annular stator.

24. The generating machine of claim 23, wherein the rotary shaft is adapted to be driven by a prime mover at a variable input speed, the output electrical current being controlled at least in part by the polyphase excitation source.

25. An electrical polyphase brushless doubly-fed motor comprising:
(a) a stator frame in which a first annular stator and a second annular stator are mounted in spaced apart relationship, end-to-end, along a common axis, each annular stator having an annular core wound with polyphase distributed windings defining a plurality of poles, said first annular stator being adapted to connect to a polyphase excitation source to cause a first electromagnetic flux to be generated in said first annular stator, and said second annular stator being adapted to connect to an AC mains;

(b) a rotary shaft rotatably mounted to extend centrally through said first and second annular stators, axially aligned with said common axis;

(c) a first cage rotor and a second cage rotor mounted on the rotary shaft, each comprising a laminated core having a plurality of generally longitudinally-extending slots defined around a periphery thereof in which at least one conductor is disposed, each conductor for a given cage rotor being electrically connected to an end ring disposed at an end of the laminated core of that cage rotor, the first cage rotor being disposed within the first annular stator so as to inductively couple with the first annular stator, the second cage rotor being disposed within the second annular stator so as to inductively couple with the second annular stator; and (d) a plurality of interconnection conductors electrically connecting the conductors in the first cage rotor to conductors in the second cage rotor in a reverse phase sequence, so that the electrical currents in the first cage rotor also circulate through the conductors in the second cage rotor, said electrical currents being determined by the shaft rotation speed and the frequencies and voltages applied to the two annular stators, causing an output torque to be applied to the shaft by the first and second rotors.

26. The motor of claim 25, wherein the rotary shaft is adapted to drive a load at a variable output torque or speed, the output speed or torque being controlled at least in part by the polyphase excitation source.

* * * * *